(12) United States Patent
Shaffer et al.

(10) Patent No.: US 8,102,985 B2
(45) Date of Patent: Jan. 24, 2012

(54) METHOD AND SYSTEM FOR PROVIDING A CAMP-ON HOLD SERVICE

(75) Inventors: Shmuel Shaffer, Palo Alto, CA (US); Labhesh Patel, San Francisco, CA (US); Mukul Jain, San Jose, CA (US); Denise G. Caballero-McCann, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1188 days.

(21) Appl. No.: 11/271,710

(22) Filed: Nov. 11, 2005

(65) Prior Publication Data

US 2007/0121878 A1    May 31, 2007

(51) Int. Cl.
H04M 3/42    (2006.01)
(52) U.S. Cl. .............................. 379/209.01; 379/210.01
(58) Field of Classification Search .............. 379/209.01, 379/215.01, 201.01, 210.01
See application file for complete search history.

(56) References Cited

U.S. PATENT DOCUMENTS

| | | | | |
|---|---|---|---|---|
| 3,963,874 A | 6/1976 | Pommerening et al. | ........ | 179/18 |
| 4,577,067 A | 3/1986 | Levy et al. | ........ | 179/99 |
| 4,809,321 A | 2/1989 | Morganstein et al. | ........ | 379/211 |
| 5,577,111 A * | 11/1996 | Iida et al. | ........ | 379/209.01 |
| 5,764,746 A * | 6/1998 | Reichelt | ........ | 379/210.01 |
| 5,809,130 A | 9/1998 | Ayala | | |
| 5,812,551 A | 9/1998 | Tsukazoe et al. | ........ | 370/399 |
| 5,995,825 A * | 11/1999 | Hietalahti | ........ | 455/414.4 |
| 6,035,031 A * | 3/2000 | Silverman | ........ | 379/209.01 |
| 6,118,861 A * | 9/2000 | Gutzmann et al. | ........ | 379/201.01 |
| 6,125,178 A | 9/2000 | Walker et al. | ........ | 379/211.01 |
| 6,178,237 B1 | 1/2001 | Horn | ........ | 379/202.01 |
| 6,453,022 B1 | 9/2002 | Weinman, Jr. | ........ | 379/88.13 |
| 6,501,750 B1 | 12/2002 | Shaffer et al. | ........ | 370/353 |
| 6,510,162 B1 | 1/2003 | Fijolek et al. | ........ | 370/432 |
| 6,546,087 B2 | 4/2003 | Shaffer et al. | ........ | 379/90.01 |
| 6,567,505 B1 | 5/2003 | Omori et al. | ........ | 379/84 |
| 6,601,099 B1 | 7/2003 | Corneliussen | ........ | 709/224 |
| 6,614,899 B1 | 9/2003 | Sollee et al. | ........ | 379/218.01 |
| 6,615,236 B2 | 9/2003 | Donovan et al. | ........ | 709/203 |
| 6,618,476 B1 | 9/2003 | Szeto et al. | ........ | 379/198 |
| 6,625,141 B1 | 9/2003 | Glitho et al. | ........ | 370/352 |
| 6,636,594 B1 | 10/2003 | Oran | ........ | 379/201.01 |
| 6,658,095 B1 | 12/2003 | Yoakum et al. | ........ | 379/93.01 |
| 6,661,799 B1 | 12/2003 | Molitor | ........ | 370/401 |

(Continued)

OTHER PUBLICATIONS

U.S. Appl. No. 09/990,668, filed Nov. 9, 2001, entitled "Method and Apparatus for Managing Incoming and Outgoing Calls at an Endpoint Placed on Hold," inventors Shmuel (nmi) Shaffer et al.

(Continued)

*Primary Examiner* — Ahmad Matar
*Assistant Examiner* — Oleg Asanbayev
(74) *Attorney, Agent, or Firm* — Baker Botts L.L.P.

(57) ABSTRACT

A method for providing a camp-on hold service comprises detecting a hold condition between a first user and a second user and establishing a call hold by placing the call on hold. The method also comprises receiving a request from the second user to camp-on to the call hold and monitoring the status of the first user during the call hold. The method also comprises receiving an indication that the first user is available to continue communications with the second user and notifying the second user that the first user is available to continue communications with the second user.

43 Claims, 2 Drawing Sheets

U.S. PATENT DOCUMENTS

| | | | | |
|---|---|---|---|---|
| 6,665,396 | B1 | 12/2003 | Khouri et al. | 379/266.01 |
| 6,665,723 | B2 | 12/2003 | Trossen | 709/227 |
| 6,678,735 | B1 | 1/2004 | Orton et al. | 709/230 |
| 6,684,147 | B2 | 1/2004 | Park et al. | 701/71 |
| 6,694,008 | B1 | 2/2004 | Mukherji et al. | 379/228 |
| 6,731,625 | B1 | 5/2004 | Eastep et al. | 370/352 |
| 6,738,390 | B1 | 5/2004 | Xu et al. | 370/467 |
| 6,751,310 | B1 | 6/2004 | Crossley | 379/266 |
| 6,754,181 | B1 | 6/2004 | Elliott et al. | 370/252 |
| 6,760,322 | B1 | 7/2004 | Fukuda et al. | 370/352 |
| 6,785,246 | B2 | 8/2004 | Foti | 370/261 |
| 6,785,560 | B1 | 8/2004 | Chow et al. | 455/564 |
| 6,788,676 | B2 | 9/2004 | Partanen et al. | 370/352 |
| 6,970,547 | B2 | 11/2005 | Andrews et al. | 379/210.01 |
| 7,006,618 | B1 | 2/2006 | Shaffer et al. | 379/215.01 |
| 7,512,659 | B2 * | 3/2009 | Keohane et al. | 709/206 |
| 2002/0078150 | A1 | 6/2002 | Thompson et al. | 709/204 |
| 2003/0185375 | A1* | 10/2003 | Albal | 379/220.01 |
| 2004/0039846 | A1* | 2/2004 | Goss et al. | 709/248 |
| 2004/0048612 | A1* | 3/2004 | Virtanen et al. | 455/426.1 |
| 2004/0203660 | A1* | 10/2004 | Tibrewal et al. | 455/414.1 |
| 2004/0228469 | A1* | 11/2004 | Andrews et al. | 379/265.03 |
| 2004/0260608 | A1* | 12/2004 | Lewis et al. | 705/14 |

OTHER PUBLICATIONS

Mahy, et al., "The Session Initiation Protocol (SIP) 'Join' Header," The Internet Society, RFC 3991, http://www.ietf.org/rfc/rfc3911.txt, 15 pgs, Oct. 2004.

Mahy, et al., "The Session Initiation Protocol (SIP) 'Replaces' Header," The Internet Society, RFC 3891, http://www.ietf.org/rfc/rfc3891.txt, 15 pgs, Sep. 2004.

Soroushnejad, et al. "Implementing Bridged Line Appearances (BLA) Using Session Initiation Protocol (SIP)," Internet Draft http://bgp.potaroo.net/ ietf/html/ids/draft-anil-sipping-bla-03.txt, 33 pgs, Jun. 2006.

Rosenberg et al., "An INVITE Initiated Dialog Event Package for the Session Initiation Protocol (SIP)," RFC 4235, http://ietfreport.isoc.org/idref/draft-ietf-sipping- dialog-package-06.txt, 38 pgs, Apr. 2005.

Mahy et al., "Remote Call Control in SIP using the REFER method and the session-oriented dialog package," Internet Draft (no longer posted on Internet), The Internet Society, 35 pgs (Feb. 2004).

Mahy et al., "Remote Call Control in Session Initiation Protocol (SIP) using the REFER method and the session-oriented dialog package," Internet Draft, http://www.ietf.org/internet-drafts/draft-mahy-sip-remote-cc-03.txt, The Internet Society, 14 pgs (Mar. 2006).

Schulzrinne, et al., "Session Initiation Protocol (SIP)-H.323 Interworking Requirements," RFC 4123, 15 pages, Jul. 2005.

Rosenberg, et al., "An Offer/Answer Model with the Session Description Protocol (SDP)," RFC 3264, 24 pages, Jun. 2002.

Rosenberg, et al., "Caller Preferences for the Session Initiation Protocol (SIP)," RFC 3841, 25 pages, Aug. 2004.

Schulzrinne, et al., "RTP Payload of DTMF Digits, Telephony Tones and Telephony Signals," RFC 2833, 27 pages, May 2000.

Roach, "Session Initiation Protocol (SIP)-Specific Event Notification," RFC 3265, 34 pages, Jun. 2005.

Rosenberg, et al., "SIP: Session Initiation Protocol," Network Working Group, RFC 3261, 269 pages, Jun. 2002.

PCT Notification of Transmittal of the International Search Report and the Written Opinion of the International Searching Authority, or the Declaration mailed Aug. 8, 2007, re PCT/US06/39367 filed Oct. 6, 2006.

U.S. Appl. No. 11/101,704, filed Apr. 8, 2005, entitled Method and System for Providing a Camp-On Service ,32 pages specification, claims and abstract, 2 pages of drawings, inventors Shmuel (nmi) Shaffer et al.

U.S. Appl. No. 10/993,681, filed Nov. 19, 2004, entitled *System and Method for Providing an eCamp Feature in a Session Initiation Protocol (SIP) Environment*, 37 pages specification, claims and abstract, 6 pages of drawings, inventors Denise G. Caballero-McCann et al.

Shaffer et al, U.S. Appl. No. 10/993,681, filed Nov. 19, 2004, Communication from the U.S. Patent and Trademark Office mailed Jan. 21, 2010.

Office Action for U.S. Appl. No. 11/101,704, (18 pages), Mar. 9, 2010.

Final Office Action for U.S. Appl. No. 10/993,681, (9 pages), Aug. 20, 2009.

Shaffer et al, U.S. Appl. No. 11/101,704, Communication from the U.S. Patent and Trademark Office mailed Aug. 18, 2009.

* cited by examiner

METHOD AND SYSTEM FOR PROVIDING A CAMP-ON HOLD SERVICE

TECHNICAL FIELD OF THE INVENTION

This invention relates generally to communications systems and, more particularly, to a method and system for providing a camp-on hold service.

BACKGROUND

Whenever a user attempts to communicate with another user electronically there is the possibility of being placed on hold. This could happen when the user is first trying to get in contact with the other user but is not able to be immediately connected and thus is put on hold while waiting for the other user to become available. It can also happen after the two users have already established their connection. For example, if one of the users is notified of an urgent task that needs immediate attention but has not yet finished his first call, he may put the other user on hold.

To address this, many systems use a camp-on feature which allows a user to have his phone connected to the called user when the called user completes his call. When the called user hangs up, the system rings and/or alerts the called user of the caller's call.

SUMMARY

In accordance with the present invention, a method and system for providing a camp-on hold service is provided which substantially eliminates or reduces the disadvantages and problems associated with previous systems and methods.

In accordance with a particular embodiment of the present invention, a method for providing a camp-on hold service comprises detecting a hold condition between a first user and a second user and establishing a call hold by placing the call on hold. The method also comprises receiving a request from the second user to camp-on to the call hold and monitoring the status of the first user during the call hold. The method also comprises receiving an indication that the first user is available to continue communications with the second user and notifying the second user that the first user is available to continue communications with the second user.

Where the method detects a hold condition to place a call on hold, the method may further include receiving, from the first user, a hold request to place the call, between the first user and the second user, on hold. Additionally, where the method receives an indication that the first user is available to continue communication with the second user, the method may include receiving from the first user a request to take the call off hold.

Where the method notifies the second user that the first user is available, the method may include notifying the second user that the first user is available via instant messaging or a phone of the second user or e-mail.

The method may also include the first user using a first phone and the second user using a second phone to communicate on the call. After receiving the request to camp-on from the second user, receiving a request from the second user to notify the second user, via a third phone, when the first user is available to continue communications with the second user. Where the method notifies the second user that the first user is available to continue communications with the second user, the method may include notifying the second user via the third phone that the first user is available to continue communications with the second user and the method may establish communications between the first user using the first phone and the second user using the third phone.

The method may also include, upon establishing the call on hold, automatically establishing an instant messaging session between the first user and the second user, wherein notifying the second user that the first user is available to continue communications with the second user includes notifying the second user, via the instant messaging session, that the first user is available to continue communications with the second user.

In accordance with another embodiment, a system for providing a camp-on hold service includes a processor that is operable to detect a hold condition to place a call between a first user and a second user on hold. The processor is further operable to establish a call hold by placing the call on hold. The system also includes an interface that is operable to receive a request from the second user to camp-on to the call hold. The processor is also operable to monitor a status of the first user during the call hold. The interface is also operable to receive an indication that the first user is available to continue communications with the second user. The processor is also operable to notify the second user that the first user is available to continue communications with the second user.

Technical advantages of particular embodiments of the present invention include methods and systems that enable a user who has been placed on hold to move away from her phone and work on other tasks or turn off the volume of her phone and not worry about missing the opportunity to rejoin the call. She can do this because the camp-on system may notify her on one or more alternate devices when the other user on the call returns. In addition, in some embodiments the system may automatically initiate an IM session between users whenever one of the users puts the other user on hold or whenever both users put each other on hold. Alternatively, in some embodiments, the system may establish an IM session between the system itself and the camping user, whereby the system uses the IM session to communicate status updates as to the state of the other, busy user. Additionally, in some embodiments, the system may inform the camping user about the state of the busy user, thereby allowing the camping user to have a better idea of how much time he has to do other tasks. Accordingly, some of the embodiments of the present invention provide users with a more efficient way of making phone calls by allowing them to perform other tasks while they are waiting on hold.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
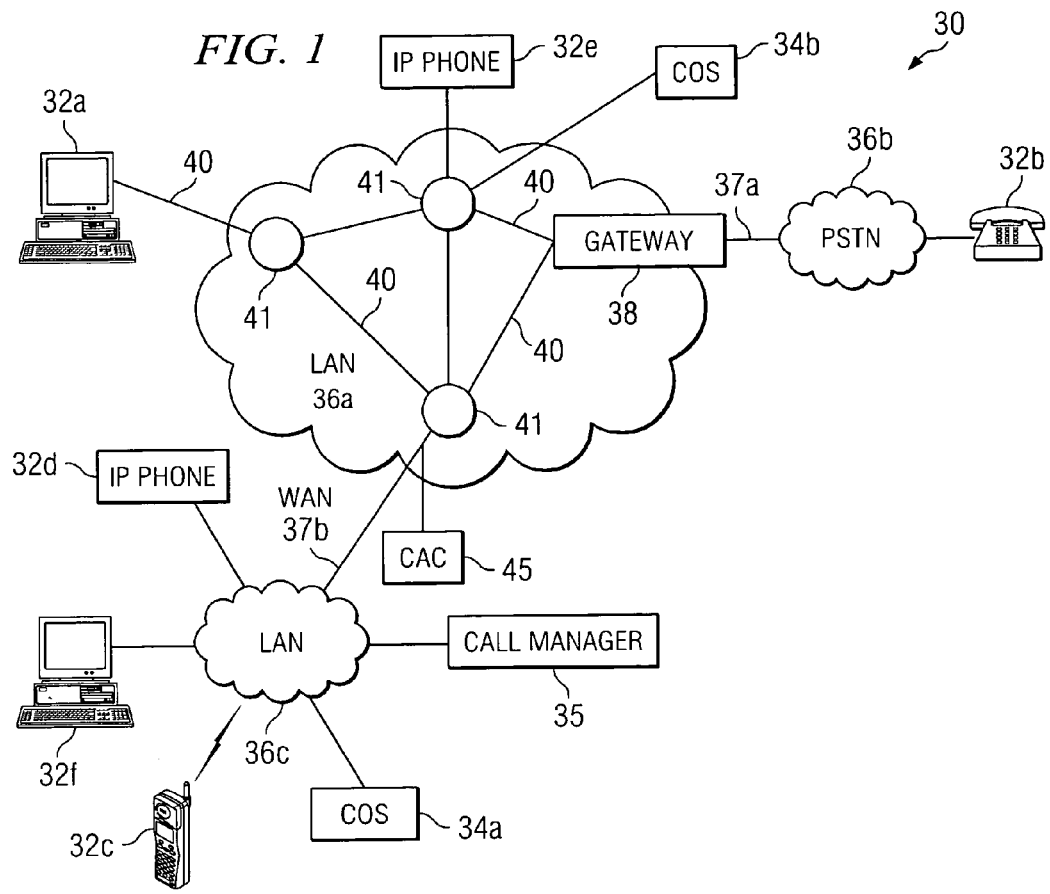
FIG. 1 illustrates a communication system including a plurality of endpoints operable to communicate among each other and a plurality of camp-on systems, in accordance with a particular embodiment of the present invention.

FIG. 1 illustrates a communication system 30 including a plurality of endpoints 32a-32f having the ability to establish communication sessions between each other and/or camp-on systems (COSs) 34a-34b, using one or more of communication networks 36a-36c. Camp-on systems 34 provide a user, who is on hold with another user, with several alternatives to simply waiting on the phone for the other user to become available. These alternatives may be elected by the individual user on hold on a call by call basis or they may be predetermined by the individual user, a system manager or the available technology. Some of the alternatives include automatically opening up alternative lines of communication, such as an IM session, or automatically sending out a notification to one or both of the users as soon as the busy user is available.

Calls shall include requests for communication transmitted using any audio and/or video means, including signals, data or messages transmitted through any suitable technology, such as voice devices, text chat, web sessions, facsimile, instant messaging and e-mail.

The following example, while illustrating some of the features and functions that may be embodied in particular embodiments, is by no means intended to be an exhaustive list of the features and functions of the present invention. The example illustrates some of the types of notifications that can be used when, after two users have established a communication session, one of the users becomes busy and has to put the other user on hold. In this situation, camp-on system 34a may receive a request to place one of the users on hold from a call management system 35, from the busy user's endpoint 32, or from any other device capable of detecting a hold state and communicating such a request. The camp-on system 34a may then open an alternate line of communication, such as an IM session, between the busy user and the holding user to allow them to continue to communicate, or it may create an IM session between itself and the holding user to provide camp-on system 34a with a means for notifying the holding user when the busy user becomes ready to resume the communication session. Additionally, once the busy user becomes available, camp-on system 34a may send a notice to the holding user to let him know that busy user is now available, and/or it may send a notice to the formerly busy user giving her information she can use to re-establish communication with the holding user.

In particular embodiments, a user who is attempting to camp-on to the hold state of another user, who may be currently busy, may indicate a request to a camp-on system 34 to be notified when the busy user becomes available using one or more particular communication methods on either mobile or non-mobile devices. In some embodiments, the request to be notified may automatically be sent to the camp-on system 34. In either case, the caller can still utilize the camp-on feature even if the caller is going to be away from his office desk phone or otherwise unable to access his normal endpoint when the busy user becomes available.

In the illustrated embodiment, communication network 36a is a local area network (LAN) that enables communication between a plurality of endpoints 32a-32f, camp-on systems 34a-34b and call manager 35. The LAN can be distributed across multiple cities and geographic regions. Communication network 36b is a public switched telephone network (PSTN) and couples endpoint 32b with communication network 36a through gateway 38. Communication network 36c is another LAN, which couples endpoints 32c, 32d, 32f, camp-on system 34a and call manager 35 with communication network 36a. Accordingly, users of endpoints 32a-32f, camp-on systems 34a-34b and call manager 35 can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and police the bandwidth available over WAN 37b.

In the illustrated embodiment, communication system 30 includes call manager 35 that maintains information on users of system 30 and facilitates communication among users. For example, call manager 35 may monitor endpoints of the communication system and transmit information regarding the status of various endpoints and/or calls. Call manager 35 may also provide other functionality typically provided by call managers in current communication systems.

Communication network 36a includes a plurality of segments 40 and nodes 41 that couple endpoints 32a and 32e with camp-on system 34b, gateway 38, and communication networks 36b-36c. Therefore, a user of endpoint 32a is provided with access to endpoints 32b-32f and camp-on systems 34a-34b. Nodes 41 may include any combination of network components, gatekeepers, call managers, conference bridges, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. In addition, communication networks in accordance with various embodiments may include any number of Private Branch exchanges (PBXs) with camp-on functionality. Generally, network 36a provides for the communication of packets, cells, frames, or other portions of information (generally referred to as packets herein) between endpoints 32a-32f. Communication network 36a may include any number and combination of segments 40, nodes 41, endpoints 32a-32f, and/or camp-on systems 34a-34b.

In a particular embodiment, communication network 36a employs voice communication protocols that allow for the addressing or identification of endpoints, nodes, and/or camp-on servers coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets are included within the scope of the present invention.

Network 36a may be directly coupled to other IP networks including, but not limited to, another LAN or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoints 32a and 32c-32f, camp-on systems 34a-34b, and gateway 38 may comprise IP telephony devices capable of participating in IM, video, and other multimedia communication sessions. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held PDAs, or any other device capable of performing telephony functions over an IP network.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32f, camp-on systems 34a-34b, call manager 35 and/or gateway 38 may be any combination of hardware, software, and/or encoded logic that provides communication services to a user. For example, endpoints 32a-32f may include a telephone, a computer running telephony software, a video monitor, a camera, an IP phone, a cell phone or any other communication hardware, software and/or encoded logic that supports the communication of packets of media (or frames) using communication network 36a. Endpoints 32a-32f may also include unattended or automated systems, gateways, other intermediate components or other devices that can establish media sessions. Although FIG. 1 illustrates a particular number and configuration of endpoints, camp-on systems, segments, nodes, and gateways, communication system 30 contemplates any number or arrangement of such components for communicating media. In addition, elements of communication system 30, such as camp-on system 34a, may include components centrally located (local) with respect to one another or distributed throughout communication system 30.

Figure 2:
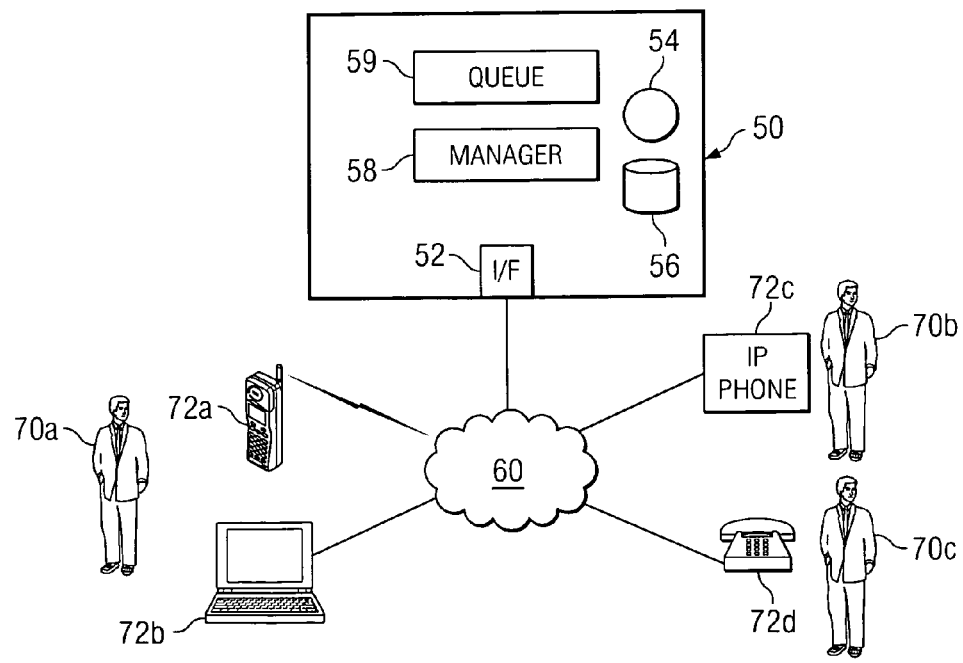
FIG. 2 illustrates a camp-on system in more detail, illustrating aspects of the present invention.

FIG. 2 illustrates a camp-on system 50 in more detail, in accordance with a particular embodiment of the present invention. Camp-on system 50 may be similar to camp-on systems 34 illustrated in FIG. 1. In the illustrated embodiment, camp-on system 50 includes an interface 52, a processor 54, memory module 56, a manager 58 and a queue 59.

Interface 52 couples camp-on system 50 with communication network 60 and is operable to receive communications from and transmit communications to communication network 60. Processor 54 may be a microprocessor, controller, or any other suitable computing device, resource, or combination of hardware, software and/or encoded logic. Processor 54 may perform camp-on, notification and connection functionality described herein with respect to particular embodiments. Memory module 56 may be any form of volatile or non-volatile memory including, without limitation, magnetic media, optical media, random access memory (RAM), read-only memory (ROM), removable media, or any other suitable local or remote memory component. Memory module 56 may store any suitable information to implement features of various embodiments, such as camp-on notification instructions as described herein.

Manager 58 maintains information on users of communication network 60 and camp-on system 50 and facilitates communication among users. Manager 58 may comprise any combination of hardware, software, and/or encoded logic. In particular embodiments, manager 58 may maintain a listing, table, or other organization of information about users. The information may include a name or other identifier for each user. The information may also include contact information such as phone numbers, and IM, SMS and email addresses for the users.

Queue 59 stores camp-on submissions from callers requesting to communicate with other users currently on the phone or otherwise in communication with other users. In some cases, a called party currently on a call may have more than one pending camp-on request (from more than one caller) at one time. Queue 59 may comprise any combination of hardware, software, and/or encoded logic.

In the illustrated embodiment, camp-on system 50 is coupled to endpoints 72 through communication network 60. Communication network 60 may include one or more communication networks and other suitable components as described above with respect to communication system 30 of FIG. 1.

Users 70 are associated with camp-on system 50 and use endpoints 72 for communication with other parties and camp-on system 50. Endpoints 72 may be similar to one or more of the endpoints 32 described above with respect to FIG. 1. Some users 70 may utilize more than one endpoint for such communication. For example, some users may utilize a cell phone, IP phone or telephone for audio communications with other users or camp-on system 50 and another type of endpoint, such as a PDA or computer, for IM or other types of communications with other users or camp-on system 50. Other users, however, may use one type of endpoint, such as a cell phone, IP phone or computer for all types of communication with other users or camp-on system 50. For example, in the illustrated embodiment user 70a currently has access to endpoints 72a (cell phone) and 72b (computer), user 70b has access to endpoint 72c (IP phone) and user 70c has access to endpoint 72d (phone).

As indicated above, particular embodiments provide a user placed on hold with the ability to camp-on to the call hold and to be notified when the other user is ready to resume the call. In some cases the call may use one communication method, such as voice communication, while another communication method, such as IM or SMS, may be used to provide options to open alternative lines of communication or to provide notice of the other user's status. The notification can include a visual alert (e.g. flashing light on a phone or flashing a message on a screen), an audible alert (e.g. a unique ringtone), a tactile alert (e.g. cell phone vibrating), or a combination of two or more types of alerts (e.g. IM session, with a text message and/or audible alert). The notification can be sent to a computer, PDA, cell phone, telephone, IP phone, or any other device capable of receiving an appropriate signal and generating an appropriate type of alert.

As an example in operation, assume that user 70*b* is using endpoint 72*c* to communicate on a voice call with user 70*a* who is using endpoint 72. During the communication session between user 70*a* and 70*b*, user 70*b* receives a request for communication from user 70*c* whereby user 70*b* places user 70*a* on hold so that user 70*b* can communicate with user 70*c*. Another similar example in operation arises when, instead of receiving a request to communicate from user 70*c*, user 70*b* receives notice of an urgent task that needs his immediate attention before user 70*b* has finished his communication session with user 70*a*. User 70*b*, instead of hanging up can put user 70*a* on hold.

In either of the examples above, depending on how camp-on system 50 has been configured, user 70*a* may utilize a camp-on hold to camp-on to the call hold through a variety of techniques. For example camp-on system 50 can be pre-provisioned so that a camp-on hold is always attempted when a user is put on hold, thereby automatically causing user 70*a* to camp-on to the call hold. In some embodiments camp-on system 50 may be pre-provisioned to automatically attempt to camp-on the call hold only when both users have placed each other on hold (for example, A puts B on hold, then while B is on hold B puts A on hold). In embodiments using either of these alternatives, the camp-on system 50 may be pre-provisioned with each user's contact information, which may include one or more preferred devices on which they want to receive notifications, so that the user does not have to re-enter them each time they want camp-on the call hold. The contact information can be predetermined by a system manager, the resources available or the individual preferences of each user. The contact information can then be stored in the camp-on system 50, for example, in memory module 56 or manager 58.

In some embodiments, camp-on system 50 can be pre-provisioned so that user 70*a* can elect to invoke the camp-on hold service on a session by session basis. For example, user 70*a* may use a telephone user interface of an IP phone (such as IP phone 72*c* used by user 70*b*) or user 70*a* may respond to a prerecorded voice prompt listing the options available to user 70*a* to invoke the camp-on hold service. If user 70*a* is making the call from an IP phone then he may be presented with a softkey that would allow him to communicate his desire to camp-on to the call hold. Similar to the automatic camping discussed above, the system may have pre-provisioned contact information for how to notify user 70*a* that the other user 70*b* is available.

The IP phone may also be configured such that user 70*a* is presented with multiple softkeys which he can use to not only elect to camp-on to the call hold, but also to elect one or more types of notifications he wants to receive once the user 70*b* is available. For example, the IP phone may include softkeys associated with the following options: a) elect to receive an audible alert of any status change of the other user indicated on the IP phone as a softkey labeled "CAMP <symbol of a bell>;"b) elect to receive a visual alert of any status change of the other user indicated on the IP phone as a softkey labeled "CAMP <symbol of a light>;" or c) elect to receive an alert of any status change of the other user as part of either a current or a new IM session, indicated on the IP phone as a softkey labeled "CAMP <IM symbol>." Each of these options could be linked to a particular device such that when it was time to send the notification it would send the selected notification to the pre-provisioned device. This provides the individual users with greater flexibility in the type of notification they receive.

Instead of having a particular alert associated with a pre-determined device associated, the IP phone could contain a second set of softkeys that would allow the user to specify where he wants to receive his notification. The user could, for example, elect one of the options presented in the first set of softkeys, such as to start an IM session by pressing the softkey labeled "CAMP <IM symbol>". Then, the user could use an appropriate softkey from the second set of softkeys to have the IM session sent to his cellular phone.

If a prerecorded prompt is used to determine whether the user 70*a* wants to use the camp-on service then the user 70*a* may listen to the message which may list the options available to him and possibly a number associated with each option. The types of notifications that can be selected from the multiple softkeys of the IP phone may be similar to the options that would be available through the audible menu discussed above. He could then enter his response by pressing the number on the keypad that corresponds to the number associated with the option he wanted as listed in the prerecorded message. If the camp-on system 50 is being used with a speech recognition device, the user could simply orally communicate his desired option. Additionally, similar to the second set of softkeys used with the IP phone, the prerecorded prompt may play a message with a second set of options that prompts the user for a particular location to send the elected notification.

When and how the camp-on functionality of the camp-on system 50 is initiated is not the only area of flexibility with the camp-on system 50. There is also a wide range of features and functionality that can be invoked should one of the users elect to camp-on the call hold.

In some situations user 70*a*, having been placed on hold, for example, by user 70*b*, may need to be away from endpoint 72*a* that he was using to communicate with user 70*b* before he was placed on hold. Particular embodiments provide user 70*a* with the ability to notify camp-on system 50 that user 70*a* may be unable to access endpoint 72*a* when user 70*b*'s call terminates but that user 70*a* may be reached via IM or another alternative communication method, such as e-mail or SMS, or through a communication endpoint, such as endpoint 72*b*. Such notification may be made via the web, e-mail, IM, SMS, DTMF signal or any other communication method.

For example, if user 70*a* is going to be unable to access endpoint 72*a*, he may notify camp-on system 50 that he may be reached via an IM or SMS account which he may access at, for example, endpoint 72*b*. When user 70*b* is ready to return to the call between users 70*b* and 70*a*, camp-on system 50 may detect or be notified of user 70*b*'s eminent return. For example, user 70*b* may notify the camp-on system 50 from endpoint 72*c*, or the camp-on system 50 can monitor another component of communication network 60 such as a call manager and detect when user 70*b* is available. Upon receiving the notification, camp-on system 50 sends a message to user 70*a* notifying him that user 70*b* is ready or will soon be ready to resume the previous communication session between them. As indicated above, this message may be sent to user 70*a* according to his stated preferences through any suitable communication method, such as via an IM or SMS that user 70*a* receives at endpoint 72*b*. User 70*a* may receive the message at any suitable endpoint to which user 70*a* has access. Once user 70*a* has been notified through, for example, IM that user 70*b*'s is available or about to become available, user 70*a* may call user 70*b* or may call camp-on system 50 or another system which may itself call or connect user 70*b* with user 70*a* through a bridging or other connection function. In some cases, camp-on system 50 may automatically set up a connection between user 70*b* and 70*a* through any specified endpoint.

In particular embodiments, user 70*a* may have contact information saved with camp-on system 50 (e.g., in memory module 56 or manager 58) to instruct camp-on system 50 how to act if user 70*a* is unavailable when user 70*b* becomes available and attempts to reconnect with user 70*a*. For example, assume that user 70*a* is camping-on to the call hold of a call initially between user 70*a* and user 70*b*, and camp-on system 50 calls user 70*a* at endpoint 72*a* to reconnect user 70*a* with user 70*b* when user 70*b* becomes available. If user 70*a* does not answer, camp-on system 50 may follow previous instructions submitted by user 70*a* and may notify user 70*a* that user 70*b* is free using those instructions. As an example, the instructions may direct camp-on system 50 to notify user 70*a* via IM (that user 70*a* may access using, for example, endpoint 72*b*) that user 70*b* has become or will soon become available to resume their communication session. Other examples may include, after user 70*a* has been notified that user 70*b* is free, having user 70*a* intercept the call from another endpoint, call user 70*b* directly or call camp-on system 50 or another system to be connected to user 70*b*. In some embodiments user 70*a* may only be notified via an alternative communication method of the availability of user 70*b* if user 70*a* does not respond to the camp-on system's attempt to notify or reconnect user 70*a* with user 70*b*.

Another option is to use the camp-on system 50 in conjunction with presence/location awareness technology. This could allow user 70*a* to receive, on the most appropriate device, his notification that user 70*b* is now available. Additionally, presence/location awareness technology, in conjunction with the camp-on system 50, can be used to transfer the original call, which user 70*a* is camping-on to, to the most appropriate device.

As mentioned above, in some embodiments, camp-on system 50 may automatically establish an alternative line of communication, such as an IM session, between users 70*a* and 70*b* thereby allowing user 70*b* to update user 70*a* as to her status and estimated time until she is available. Additionally, user 70*a* can let user 70*b* know if he is going to step away for awhile or will otherwise be engaged in his own work. This alternate line of communication can be opened either as soon as one of the users puts the other user on hold, as soon as both users put each other on hold, or when one of the users elects to camp-on the hold status of the other user. By opening up an alternative line of communication between users 70*a* and 70*b* the camp-on system 50 may allow, for example: 1) user 70*a* to be notified periodically of how much longer user 70*b* will be busy; 2) user 70*a* to let user 70*b* know he is still on hold or that he is no longer going to remain on hold; 3) user 70*a* to provide user 70*b* with a contact number or address to use to re-establish the communication session later; and/or 4) user 70*a* to be provided with some advance notice of when user 70*b* is about to become available. This may allow the holding user to finish up whatever he was doing gracefully and return to the previous communication session.

To illustrate at least one possibility, suppose user 70*a* and user 70*b* are currently in the midst of a communication session when user 70*b* is notified of an urgent task that needs his immediate attention. User 70*b* then puts user 70*a* on hold. While user 70*a* is on hold, he also receives an urgent task and puts user 70*b* on hold. When camp-on system 50 detects both users have placed each other on hold, the system may automatically bring up an IM session between users 70*a* and 70*b*. In another embodiment the camp-on system 50 can be pre-provisioned such that both of the users' IM clients are programmed to show that the IM session was started by the camp-on system 50 to facilitate a parallel communication channel while the parties have placed each other on hold.

In some embodiments camp-on system 50 may not know the IM address of one of the users. In such a situation camp-on system 50 can act upon the detection of the on-hold notification by establishing an IM session between the user associated with the known IM address and camp-on system 50. Using this IM session, camp-on system 50 can notify the known user that the unknown user has placed his call on hold. The same IM session may be used to notify the known user that the unknown user has just gotten off the on-hold state and is ready to resume the call.

In some embodiments, when user 70*b* becomes available, camp-on system 50 may request that user 70*b* wait while the camp-on system 50 attempts to locate and/or contact user 70*a* to let user 70*a* know that user 70*b* is now available. Camp-on system 50 may even place user 70*b* on hold while it attempts to locate and/or notify user 70*a*. Camp-on system 50 may notify user 70*a*, for example through IM or any other communication method previously selected by user 70*a*, that user 70*b* is ready to communicate with user 70*a*. Camp-on system 50 may provide user 70*a* with a number to call in order to be bridged with user 70*b*. In some cases, camp-on system 50 may provide user 70*a* with a password or other ID information to utilize with the number to connect with user 70*b*. When user 70*a* calls the number (e.g., using endpoint 72*a*), user 70*a* may be connected with user 70*b*. In some cases camp-on system 50 may include a bridge function to connect endpoints 72*a* and 72*c* through camp-on system 50 so that users 70*a* and 70*b* may communicate.

It will be recognized by those of ordinary skill in the art that camp-on system 50 is merely one example configuration of a camp-on system for providing a camp-on service, in accordance with an embodiment of the present invention. Other camp-on systems may include any number of interfaces, managers, processors, memory modules, queues and/or other components to accomplish the functionality and features described herein. For example, although camp-on system 50 is illustrated and described as including interface 52, processor 54, memory module 56, manager 58 and queue 59, these components and other desired components for performing the above described functionality may be centrally located (local) with respect to one another, or distributed throughout communication network 60.

Figure 3:
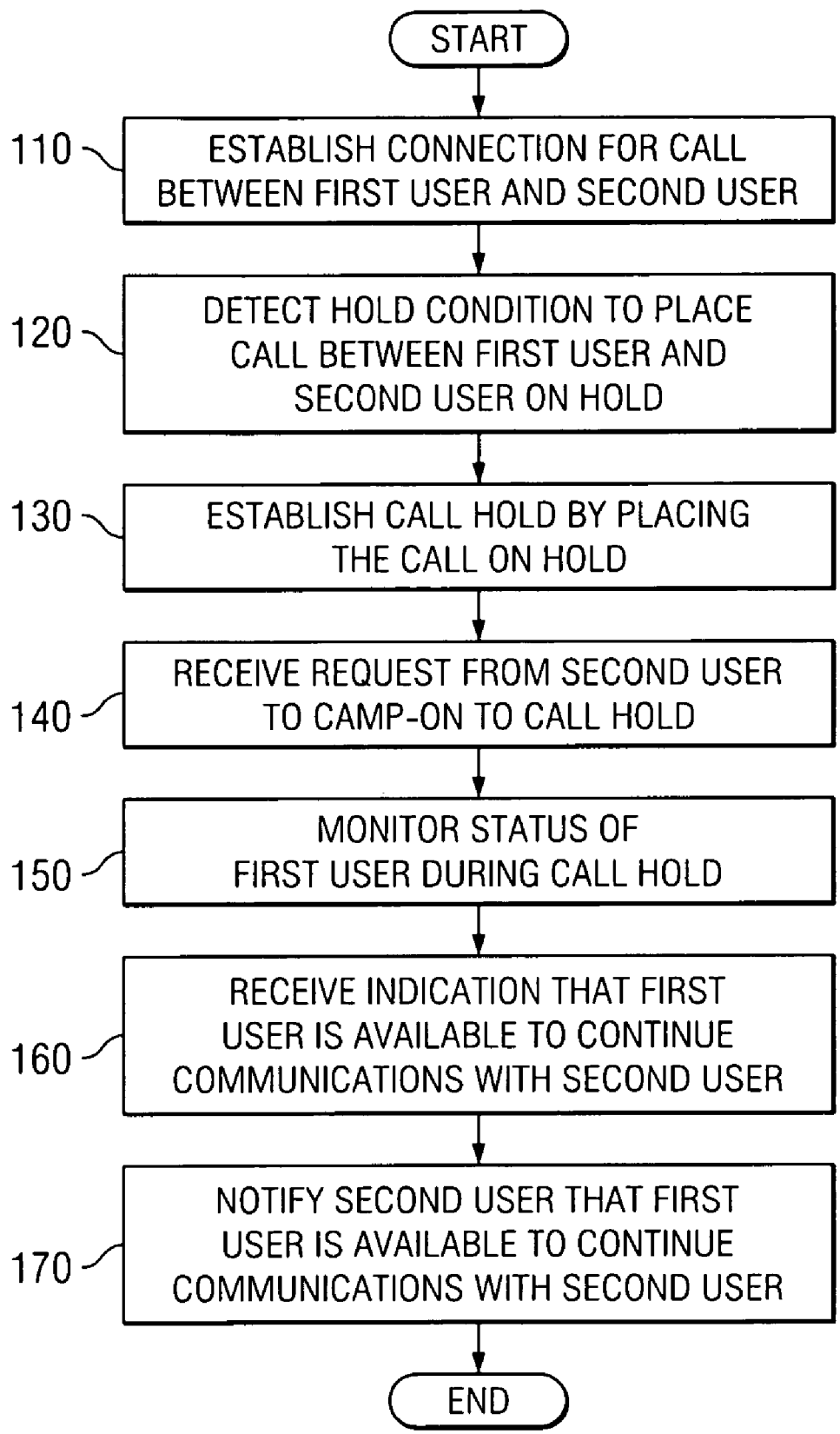
FIG. 3 illustrates a method for providing a camp-on hold service, in accordance with an embodiment of the present invention.

FIG. 3 is a flowchart illustrating a method for providing a camp-on service, in accordance with an embodiment of the present invention. The method begins at step 110 where a first user attempts to establish a communication session with a second user via a first communication method. For example, the first user may use a phone, such as an IP phone, to dial a cell phone of the second user.

The two users will remain connected until either their call is finished or one of them receives an urgent task requiring them to place the other user on hold. In step 120, the camp-on system detects the hold condition to place the call between the first user and the second user on hold. Detecting the hold condition may include, for example, receiving from one user a request to place the call on hold or detecting that one user has received and/or answered another call thereby automatically placing the original call on hold. Once the system detects a hold condition, at step 130 it places one of the users on hold and establishes a call hold. For simplicity, the user who has been placed on hold will be referred to as the holding user, and the other user will be referred to as the busy user.

Once the holding user is placed on hold and the camp-on system has established a call hold, the camp-on system may wait to determine if a camp-on hold request is received at step 140. In some embodiments the request is automatically placed either by the camp-on system itself, or by a separate component, such as a call manager. In other embodiments the request is received from the holding user who has elected to camp-on to the call hold. If such a request is received the camp-on system will begin to initiate the camp-on hold functionality.

The request to camp-on to the call hold may include a request for a particular type of notification to be delivered to the holding user and/or it may include a request that the notification be sent to a particular device. Again, this request can be received directly from the holding user, from a separate component or from the camp-on system itself. Regardless of how the request is received, the types of notifications that can be sent are as varied as technology allows. Some of the examples discussed above with respect to FIG. 2 include an IM session, a unique ringtone, or a flashing light.

Once the request to camp-on to the call hold has been received, the holding user is then free to do other work while the camp-on system monitors the busy user's status at step 150. This is because the holding user does not have to remain on the line waiting for the busy user to become available because the holding user will receive a notification at step 160 when the camp-on system detects a change in the busy user's hold status. Depending on how the camp-on system is set up, the change of the busy user's hold status may automatically be sent to the camp-on system, or the busy user may have to actively perform a task to let the camp-on system know that she is now available. For example, if the busy user was on another call then when that call terminated the camp-on system may detect that the call was terminated and that the busy user is now available.

After receiving, at step 160, an indication that the busy user is now free, the camp-on system, at step 170, sends a notification to the holding user to let the holding user know that the busy user is, or will soon be, available to resume the communication session. The notice will be sent according the holding user's preference, either as entered with the request at step 140 or as pre-provisioned the camp-on system or some other component capable of storing and communicating such information. For example, the camp-on system may send the notification through an IM session that has been established either between the camp-on system and the holding user, or between the busy user and the holding user. The notification can also be sent as an e-mail to the holding user to let him know that the busy user is now available or the camp-on system may call the busy user and play a recorded message with contact information for the holding user.

After sending the appropriate notice, the holding user can attempt to reconnect through the same phone that he had originally used or through a different phone which he has used to intercept the call at another location.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments include methods and systems that enable a user to camp-on to a busy user's call hold and to be notified using another communication method, such as instant messaging (IM), when the busy user becomes available. Thus, the holding user can still utilize the camp-on feature even if the holding user is going to be away from his phone or otherwise unable to access his normal endpoint when the busy user becomes available. Thus, different methods of communication are integrated to provide camp-on features. This saves time for parties utilizing camp-on functionality and also avoids waste of system resources that may otherwise be used to try and reach a user of the camp-on system who is unavailable to access certain communication endpoints.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and camp-on system 50, these elements may be combined, rearranged or positioned in order to accommodate particular routing architectures or needs. In addition, any of these elements may be provided as separate external components to communication system 30, camp-on system 50 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing a camp-on hold service, comprising:
    detecting a hold condition to place a call between a first user and a second user on hold, the second user participating in the call via a first communication device using a first type of communication;
    establishing a call hold by placing the call on hold;
    receiving a request from the second user to camp-on to the call hold;
    receiving from the second user via the first communication device communication information associated with the second user and identifying a second type of communication different than the first type of communication, the communication information for notifying the second user that the first user is available to continue communications with the second user;
    after receiving the communication information associated with the second user, establishing a new communication session between at least a camp-on system and the second user using the second type of communication, the new communication session established before the first user is available to use the first type of communication to continue communications with the second user;
    monitoring a status of the first user during the call hold;
    receiving an indication that the first user is available to continue communications with the second user; and
    notifying the second user via the second type of communication that the first user is available to continue communications with the second user.

2. The method of claim 1, wherein detecting a hold condition to place a call on hold comprises receiving, from the first user, a hold request to place the call, between the first user and the second user, on hold.

3. The method of claim 1, wherein receiving an indication that the first user is available to continue communications with the second user comprises receiving from the first user a request to take the call off hold.

4. The method of claim 1, wherein notifying the second user that the first user is available to continue communications comprises notifying the second user via instant massaging that the first user is available to continue communications.

5. The method of claim 1, further comprising notifying the second user via a short message service (SMS) message that the first user is available to continue communications.

6. The method of claim 1, further comprising notifying the second user via e-mail that the first user is available to continue communications.

7. The method of claim 1:
wherein the first user uses a first phone and the second user uses a second phone to communicate on the call using the first type of communication;
further comprising, after receiving the request to camp-on from the second user, receiving a request from the second user to use the second type of communication to notify the second user via a second communication device different than a phone when the first user is available to continue communications with the second user;
wherein notifying the second user that the first user is available to continue communications with the second user comprises using the second type of communication to notify the second user via the second communication device that the first user is available to continue communications with the second user.

8. The method of claim 1, wherein:
establishing a new communication session between at least a camp-on system and the second user using the second type of communication comprises establishing an instant messaging session between the camp-on system, the first user, and the second user; and
notifying the second user that the first user is available to continue communications with the second user comprises notifying the second user via the instant messaging session that the first user is available to continue communications with the second user.

9. A system for providing a camp-on hold service, comprising:
a processor operable to:
detect a hold condition to place a call between a first user and a second user on hold, the second user participating in the call via a first communication device using a first type of communication; and
establish a call hold by placing the call on hold;
an interface coupled to the processor and operable to:
receive a request from the second user to camp-on to the call hold;
receive from the second user via the first communication device communication information associated with the second user and identifying a second type of communication different than the first type of communication, the communication information for notifying the second user that the first user is available to continue communications with the second user; and
after receiving the communication information associated with the second user, establish a new communication session between at least a camp-on system and the second user using the second type of communication, the new communication session established before the first user is available to use the first type of communication to continue communications with the second user;
the processor operable to monitor a status of the first user during the call hold;
the interface operable to receive an indication that the first user is available to continue communications with the second user; and
the processor operable to notify the second user via the second type of communication that the first user is available to continue communications with the second user.

10. The system of claim 9, wherein the processor operable to detect a hold condition to place a call on hold comprises the processor operable to receive, from the first user, a hold request to place the call, between the first user and the second user, on hold.

11. The system of claim 9, wherein the interface operable to receive an indication that the first user is available to continue communications with the second user comprises the interface operable to receive from the first user a request to take the call off hold.

12. The system of claim 9, wherein the processor operable to notify the second user that the first user is available to continue communications comprises the processor operable to notify the second user via instant massaging that the first user is available to continue communications.

13. The system of claim 9, wherein the processor is further operable to notify the second user via a short message service (SMS) message that the first user is available to continue communications.

14. The system of claim 9, wherein the processor is further operable to notify the second user via e-mail that the first user is available to continue communications.

15. The system of claim 9, wherein:
the first user uses a first phone and the second user uses a second phone to communicate on the call using the first type of communication;
the interface is further operable to, after receiving the request to camp-on from the second user, receive a request from the second user to use the second type of communication to notify the second user via a second communication device different than a phone when the first user is available to continue communications with the second user;
the processor operable to notify the second user that the first user is available to continue communications with the second user comprises the processor operable to use the second type of communication to notify the second user via the second communication device that the first user is available to continue communications with the second user.

16. The system of claim 9, wherein:
the processor operable to establish a new communication session between at least a camp-on system and the second user using the second type of communication comprises a processor operable to establish an instant messaging session between the camp-on system, the first user, and the second user; and
the processor operable to notify the second user that the first user is available to continue communications with the second user comprises a processor operable to notify the second user via the instant messaging session that the first user is available to continue communications with the second user.

17. A non-transitory computer readable storage medium comprising code that when executed by a processor is operable to:
detect a hold condition to place a call between a first user and a second user on hold, the second user participating in the call via a first communication device using a first type of communication;
establish a call hold by placing the call on hold;
receive a request from the second user to camp-on to the call hold;
receive from the second user via the first communication device communication information associated with the second user and identifying a second type of communication different than the first type of communication, the communication information for notifying the second user that the first user is available to continue communications with the second user;

after receiving the communication information associated with the second user, establish a new communication session between at least a camp-on system and the second user using the second type of communication, the new communication session established before the first user is available to use the first type of communication to continue communications with the second user;

monitor a status of the first user during the call hold;

receive an indication that the first user is available to continue communications with the second user; and notify the second user via the second type of communication that the first user is available to continue communications with the second user.

18. The medium of claim 17, wherein the code operable to detect a hold condition to place a call on hold comprises code operable to receive, from the first user, a hold request to place the call, between the first user and the second user, on hold.

19. The medium of claim 17, wherein the code operable to receive an indication that the first user is available to continue communications with the second user comprises code operable to receive from the first user a request to take the call off hold.

20. The medium of claim 17, wherein the code operable to notify the second user that the first user is available to continue communications comprises code operable to notify the second user via instant massaging that the first user is available to continue communications.

21. The medium of claim 17, wherein the code is further operable to notify the second user via a short message service (SMS) message that the first user is available to continue communications.

22. The medium of claim 17, wherein the code is further operable to notify the second user via e-mail that the first user is available to continue communications.

23. The medium of claim 17, wherein:
the first user uses a first phone and the second user uses a second phone to communicate on the call using the first type of communication;
the code is further operable to, after receiving the request to camp-on from the second user, receive a request from the second user to use the second type of communication to notify the second user via a second communication device different than a phone when the first user is available to continue communications with the second user;
the code operable to notify the second user that the first user is available to continue communications with the second user comprises code operable to use the second type of communication to notify the second user via the second communication device that the first user is available to continue communications with the second user.

24. The medium of claim 17 wherein:
the code operable to establishing a new communication session between at least a camp-on system and the second user using the second type of communication comprises code operable to establish an instant messaging session between the camp-on system, the first user, and the second user; and
the code operable to notify the second user that the first user is available to continue communications with the second user comprises code operable to notify the second user via the instant messaging session that the first user is available to continue communications with the second user.

25. A method for providing a camp-on hold service, comprising:

detecting a hold condition to place on hold a first call between a first user and a second user using a first line of communication, the second user using a first communication device for the first call, the hold condition arising upon the first user using the first line of communication for a second call;

establishing a call hold by placing the first call on hold;

receiving a request from the second user via the first communication device to camp-on to the call hold;

receiving from the second user an identifier of a second communication device that supports a second line of communication;

establishing a third call between the first user and the second user using the second line of communication, the third call established while the first user is using the first line of communication for the second call;

monitoring a status of the first user during the call hold;

receiving an indication that the first user is available to continue communications with the second user via the first line of communication; and notifying the second user via the second line of communication that the first user is available to continue communications with the second user via the first line of communication.

26. The method of claim 1, further comprising determining from the communication information received from the second user via the first communication device that the second user is to be notified that the first user is available to continue communications with the second user via the second type of communication different than the first type of communication.

27. The method of claim 25, wherein receiving an indication that the first user is available to continue communications with the second user comprises receiving from the first user a request to take the call off hold.

28. The method of claim 25, wherein notifying the second user via the second line of communication that the first user is available to continue communications comprises notifying the second user via instant massaging that the first user is available to continue communications.

29. The method of claim 25, further comprising notifying the second user via a short message service (SMS) message that the first user is available to continue communications.

30. The method of claim 25, further comprising notifying the second user via e-mail that the first user is available to continue communications.

31. The method of claim 25:
wherein the first user uses a first phone and the first communication device comprises a second phone, the first phone and the second phone configured to communicate on the call using the first line of communication;
further comprising, after receiving the request to camp-on to the call hold from the second user, receiving a request from the second user to use the second line of communication to notify the second user via a second communication device different than a phone when the first user is available to continue communications with the second user; and
wherein notifying the second user via the second line of communication that the first user is available to continue communications with the second user comprises using the second line of communication to notify the second user via the second communication device that the first user is available to continue communications with the second user.

32. A system for providing a camp-on hold service, comprising:

a processor operable to:
   detect a hold condition to place on hold a first call between a first user and a second user using a first line of communication, the second user using a first communication device for the first call, the hold condition arising upon the first user using the first line of communication for a second call; and
   establish a call hold by placing the first call on hold; and
an interface coupled to the processor and operable to:
   receive a request from the second user via the first communication device to camp-on to the call hold; and
   receive from the second user an identifier of a second communication device that supports a second line of communication; and
the processor further operable to:
   establish a third call between the first user and the second user using the second line of communication, the third call established while the first user is using the first line of communication for the second call;
   monitor a status of the first user during the call hold;
   receive an indication that the first user is available to continue communications with the second user via the first line of communication; and
   notify the second user via the second line of communication that the first user is available to continue communications with the second user via the first line of communication.

33. The system of claim 32, wherein the interface operable to receive an indication that the first user is available to continue communications with the second user comprises an interface operable to receive from the first user a request to take the call off hold.

34. The system of claim 32, wherein the processor operable to notify the second user via the second line of communication that the first user is available to continue communications comprises a processor operable to notify the second user via instant massaging that the first user is available to continue communications.

35. The system of claim 32, wherein the processor is further operable to notify the second user via a short message service (SMS) message that the first user is available to continue communications.

36. The system of claim 32, wherein the processor is further operable to notify the second user via e-mail that the first user is available to continue communications.

37. The system of claim 32:
   wherein the first user uses a first phone and the first communication device comprises a second phone, the first phone and the second phone configured to communicate on the call using the first line of communication;
   wherein the interface is further operable to, after receiving the request to camp-on to the call hold from the second user, receive a request from the second user to use the second line of communication to notify the second user via a second communication device different than a phone when the first user is available to continue communications with the second user; and
   wherein the processor operable to notify the second user via the second line of communication that the first user is available to continue communications with the second user comprises a processor operable to use the second line of communication to notify the second user via the second communication device that the first user is available to continue communications with the second user.

38. A non-transitory computer readable storage medium comprising code that when executed by a processor is operable to:
   detect a hold condition to place on hold a first call between a first user and a second user using a first line of communication, the second user using a first communication device for the first call, the hold condition arising upon the first user using the first line of communication for a second call;
   establish a call hold by placing the first call on hold;
   receive a request from the second user via the first communication device to camp-on to the call hold;
   receive from the second user an identifier of a second communication device that supports a second line of communication;
   establish a third call between the first user and the second user using the second line of communication, the third call established while the first user is using the first line of communication for the second call;
   monitor a status of the first user during the call hold;
   receive an indication that the first user is available to continue communications with the second user via the first line of communication; and
   notify the second user via the second line of communication that the first user is available to continue communications with the second user via the first line of communication.

39. The medium of claim 38, wherein the code operable to receive an indication that the first user is available to continue communications with the second user comprises code operable to receive from the first user a request to take the call off hold.

40. The medium of claim 38, wherein the code operable to notify the second user via the second line of communication that the first user is available to continue communications comprises code operable to notify the second user via instant massaging that the first user is available to continue communications.

41. The medium of claim 40, wherein the code is further operable to notify the second user via a short message service (SMS) message that the first user is available to continue communications.

42. The medium of claim 40, wherein the code is further operable to notify the second user via e-mail that the first user is available to continue communications.

43. The medium of claim 40:
   wherein the first user uses a first phone and the first communication device comprises a second phone, the first phone and the second phone configured to communicate on the call using the first line of communication;
   wherein the code is further operable to, after receiving the request to camp-on to the call hold from the second user, receive a request from the second user to use the second line of communication to notify the second user via a second communication device different than a phone when the first user is available to continue communications with the second user; and
   wherein the code operable to notify the second user via the second line of communication that the first user is available to continue communications with the second user comprises code operable to use the second line of communication to notify the second user via the second communication device that the first user is available to continue communications with the second user.

* * * * *